United States Patent
Veracini

(10) Patent No.: US 10,501,958 B2
(45) Date of Patent: Dec. 10, 2019

(54) COVERING AND PROTECTING DEVICE

(71) Applicant: Giuseppe Veracini, Brescia (IT)

(72) Inventor: Giuseppe Veracini, Brescia (IT)

( * ) Notice: Subject to any disclaimer, the term of this patent is extended or adjusted under 35 U.S.C. 154(b) by 0 days.

(21) Appl. No.: 15/579,883

(22) PCT Filed: May 12, 2016

(86) PCT No.: PCT/IB2016/052722
§ 371 (c)(1),
(2) Date: Dec. 5, 2017

(87) PCT Pub. No.: WO2016/198972
PCT Pub. Date: Dec. 15, 2016

(65) Prior Publication Data
US 2018/0163428 A1    Jun. 14, 2018

(30) Foreign Application Priority Data

Jun. 9, 2015  (IT) .................. 102015000021750

(51) Int. Cl.
*E04H 15/06*  (2006.01)
*B60J 11/04*  (2006.01)
(Continued)

(52) U.S. Cl.
CPC .............. *E04H 15/06* (2013.01); *B60J 11/02* (2013.01); *B60J 11/04* (2013.01); *B60P 3/341* (2013.01);
(Continued)

(58) Field of Classification Search
CPC ......... E04H 15/02; E04H 15/06; E04H 15/54; E04H 15/46; E04H 15/20; E04H 15/38;
(Continued)

(56) References Cited

U.S. PATENT DOCUMENTS 3,333,594 A  8/1967  Moss
5,529,368 A  6/1996  Cui et al.
(Continued)

FOREIGN PATENT DOCUMENTS

DE  18 22 812 U   12/1960
DE  31 20 415 A1  12/1982
(Continued)

OTHER PUBLICATIONS

International Search Report and Written Opinion of the International Searching Authority for corresponding International Patent Application No. PCT/IB2016/052722 dated Aug. 2, 2016, 12 pages.
(Continued)

*Primary Examiner* — Winnie Yip
(74) *Attorney, Agent, or Firm* — Merchant & Gould P.C.

(57) ABSTRACT

A cover device (1) includes a hard case (4) suitable to be positioned on a support (5) that keeps the cover device raised with respect to a lower bottom surface (6). In the closed configuration, the case contains a cover (2) wound inside it. When the case opens, the cover is suitable to come out, unwinding and outstretching itself around the case (4) in a radial direction, passing from the wound configuration to the outstretched configuration to cover an area of space under the cover between the lower bottom surface (6) and the cover (2).

20 Claims, 10 Drawing Sheets

(51) Int. Cl.
  *B60P 3/34* (2006.01)
  *E04H 15/20* (2006.01)
  *E04H 15/54* (2006.01)
  *B60J 11/02* (2006.01)

(52) U.S. Cl.
  CPC .............. *E04H 15/20* (2013.01); *E04H 15/54* (2013.01); *E04H 2015/205* (2013.01); *E04H 2015/206* (2013.01)

(58) Field of Classification Search
  CPC .......... E04H 2015/205; E04H 2015/206; B60J 11/04; B60J 11/06; B60J 11/02; B60P 3/36; B60P 3/341
  USPC ..... 135/96, 88.01, 88.07, 88.1, 88.11, 88.12, 135/117, 119, 905, 90; 296/136.01, 296/136.05, 136.1, 136.11, 136.03
  See application file for complete search history.

(56) References Cited

U.S. PATENT DOCUMENTS

| | | | | |
|---|---|---|---|---|
| 5,795,012 | A * | 8/1998 | Liou | B60J 11/00 135/16 |
| 5,893,237 | A * | 4/1999 | Ryon | E04H 15/20 135/116 |
| 6,012,759 | A * | 1/2000 | Adamek | B60J 11/02 296/136.03 |
| 6,935,674 | B1 * | 8/2005 | Campos | B60J 11/00 296/136.1 |
| 7,562,928 | B1 | 7/2009 | Morazan | |
| 8,167,356 | B1 * | 5/2012 | Morazan | B60J 11/00 296/136.01 |
| 8,651,555 | B2 * | 2/2014 | Chan | B60J 11/04 150/166 |
| 9,352,642 | B2 * | 5/2016 | Fogarty | B60J 11/04 |
| 9,815,359 | B2 * | 11/2017 | Morazan | B60J 11/04 |
| 2003/0070774 | A1 * | 4/2003 | Li | B60J 11/00 160/370.21 |
| 2004/0135393 | A1 * | 7/2004 | Neuer | B60J 7/165 296/136.1 |
| 2004/0178618 | A1 | 9/2004 | Rhea et al. | |
| 2005/0224105 | A1 | 10/2005 | Yang | |
| 2006/0162873 | A1 * | 7/2006 | Dao | B60J 11/00 160/122 |
| 2006/0214465 | A1 * | 9/2006 | Chau | B60J 11/00 296/136.1 |
| 2018/0043758 | A1 * | 2/2018 | Merryman | B60J 11/04 |

FOREIGN PATENT DOCUMENTS

| | | | |
|---|---|---|---|
| DE | 196 23 555 C1 | 7/1997 | |
| EP | 0 204 670 A2 | 12/1986 | |
| EP | 1 314 607 A1 | 5/2003 | |
| GB | 2 378 925 A | 2/2003 | |
| JP | H10-58988 A | 3/1998 | |
| WO | 2008/062284 A2 | 5/2008 | |
| WO | WO-2016207791 A1 * | 12/2016 | .............. B60J 11/04 |
| WO | WO-2017125032 A1 * | 7/2017 | .............. B60J 11/04 |

OTHER PUBLICATIONS

European Office Action for corresponding European Patent Application No. 16730898.8 dated Dec. 11, 2018, 5 pages.

* cited by examiner sez. A-A

COVERING AND PROTECTING DEVICE

This application is a National Stage Application of PCT/IB2016/052722, filed 12 May 2016, which claims benefit of Serial No. 102015000021750, filed 9 Jun. 2015, and which applications are incorporated herein by reference. To the extent appropriate, a claim of priority is made to each of the above disclosed applications.

BACKGROUND OF THE INVENTION

This invention relates, in general, to a protective cover. In particular, the invention relates to a cover device intended to protect a region of space from the weather or from damage due to vandalism. The cover device is for example intended for the protection of land, sea or air vehicles or, on a large scale, the protection of job site or exhibition areas.

In the art, various types of cloths are known suitable for covering cars, boats or trucks parked outside to protect them from the elements. In addition, cloths of larger size are known to be mounted on special frames to cover larger areas for example during construction or maintenance site for civil works or to protect visitors to an exhibition or a trade fair.

However, this type of cloths require costly and lengthy assembly and disassembly operations and are not suitable to resist possible vandalism. In fact, the above cloths, generally made of flexible plastic material (for example PVC), are impractical to use because the operator must open and extend the cloth around or above the area to be covered and, then, secure the perimeter of the cloth using cables or ropes so that it remains anchored to the frame to which it is tied. Moreover, once the cloth has finished its function, it is necessary to untie the cloth from the frame and fold it manually to store it its case or in the storage area.

SUMMARY OF THE INVENTION

The purpose of this invention is to provide a cover device suitable to protect a region of space from the weather or possible acts of vandalism that overcomes the above-mentioned drawbacks, making it fast and easy to open and close the covering, as well as to place it in its case/storage area.

BRIEF DESCRIPTION OF THE DRAWINGS

The characteristics and advantages of this invention will be apparent from the following description, given by way of non-limiting example, in accordance with the accompanying figures, wherein.

DETAILED DESCRIPTION OF THE DRAWINGS

Figure 1:
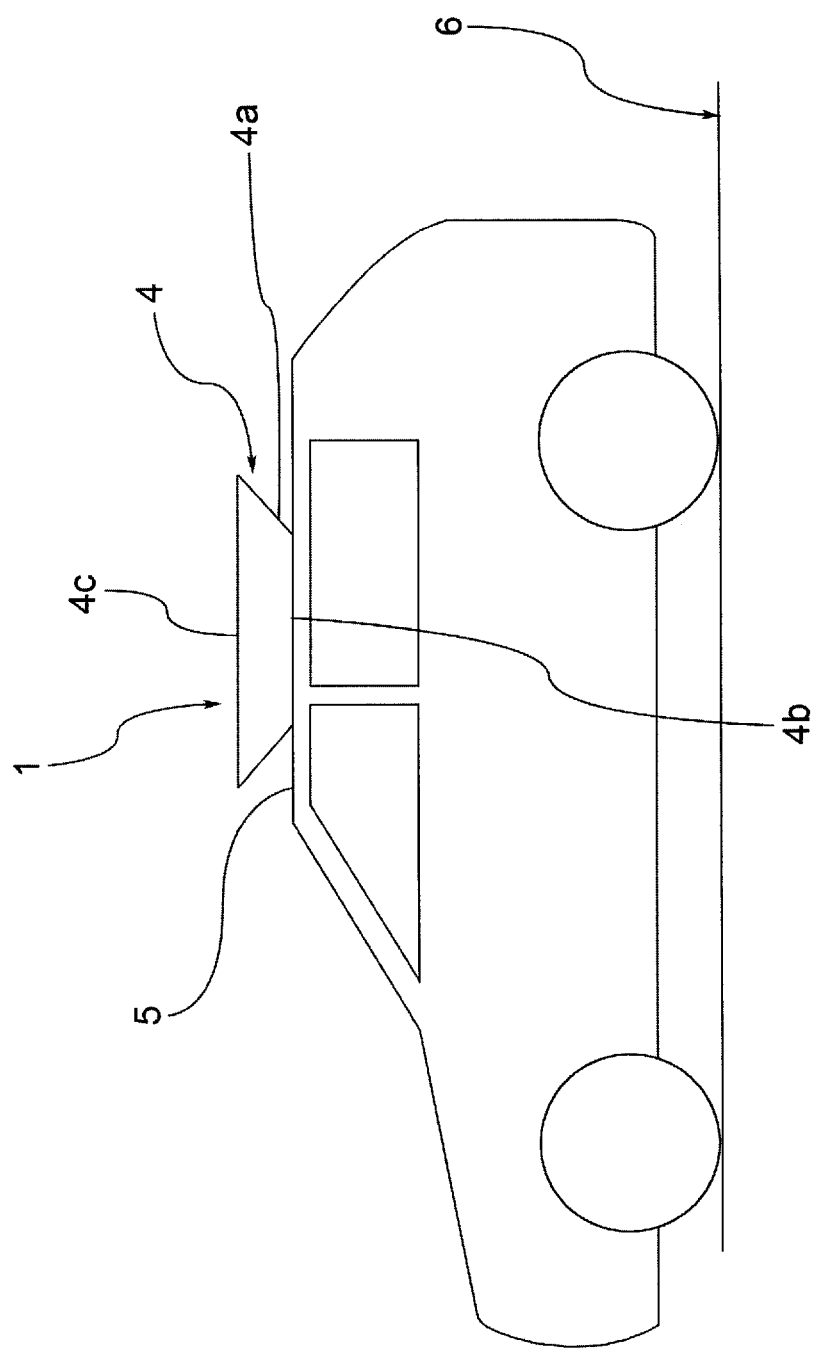
FIG. 1 schematically represents a cover device in its closed configuration, in an embodiment of this invention, in particular positioned above a roof of a motor vehicle.

In accordance with the attached figures, 1 indicates a cover device in its entirety, comprising a cover 2, suitable to assume a wound configuration and an outstretched configuration, and a rigid case 4 suitable to be positioned on a support 5 that keeps the case 4 raised with respect to a lower bottom surface 6. The case 4 is suitable to assume a closed configuration (for example shown in FIG. 1), in which the cover 2 is contained at least in most part in this case 4 in the wound configuration.

Preferably, the cover 2 in the wound configuration is totally contained inside the case 4 in the closed configuration.

Figure 2:
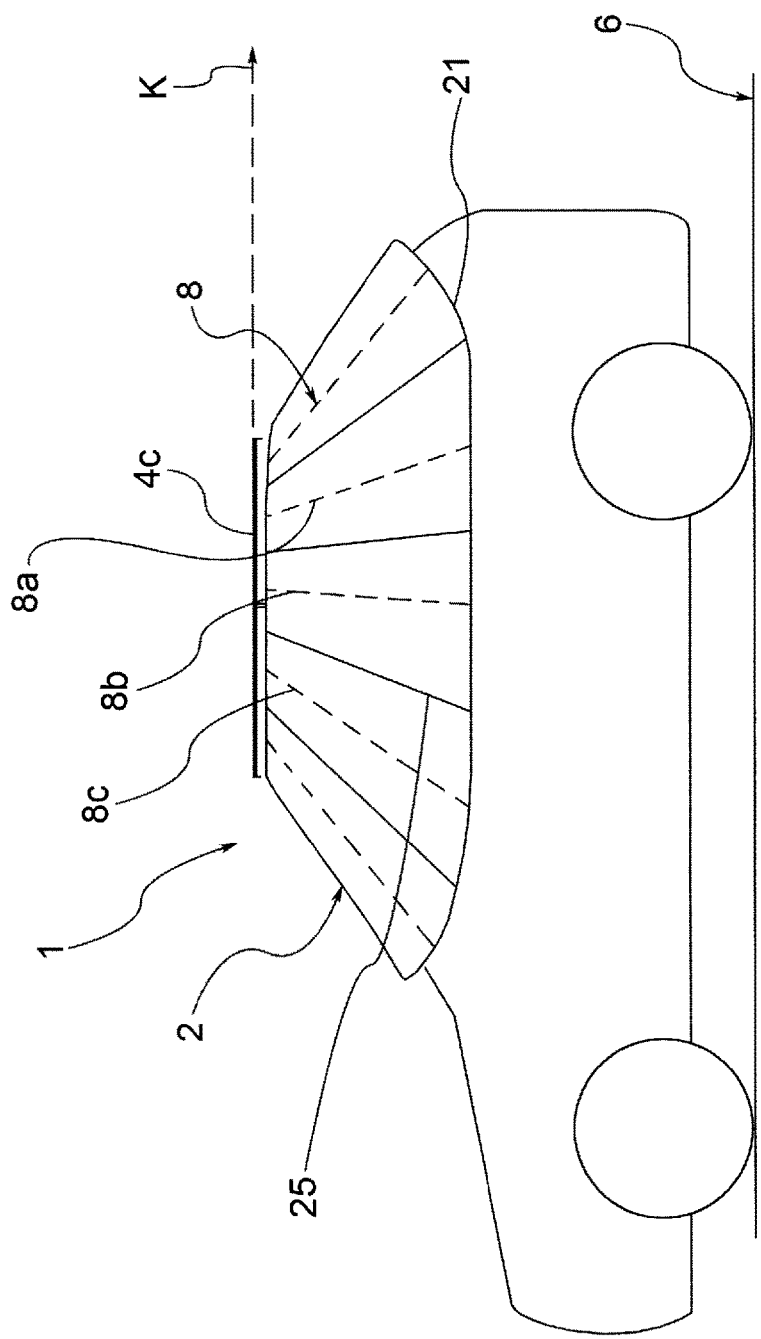
FIG. 2 schematically represents a cover device in its open configuration, with the cover stretched out in an embodiment of this invention.

When the case 4 assumes the open configuration, the cover 2 is suitable to come out, unwinding and outstretching itself around the case 4 in a radial direction K, passing from the wound configuration to the outstretched configuration to cover an area of space under the cover 2 and comprised between the lower bottom surface 6 and the cover 2 itself. An example of outstretched configuration of the cover is shown in FIG. 2, in which the cover is extended radially from the case to form an "umbrella" covering to cover a portion of a motor vehicle.

In an embodiment, the cover is suitable to come out by unwinding and outstretching around the case 4 in a symmetrical manner with respect to the centre of the case 4, along at least two main radial directions K, W. The centre of the case is, for example, the intersection of the two main directions K, W. For example, in the case where the cover assumes a circular shape, it extends radially and symmetrically with respect to the centre of the case 4 in the same way as the waves generated by a stone thrown into a body of water propagate radially from the centre of the stone.

Preferably, a plan projection from above of the region of space covered has a substantially circular or substantially elliptical, or pseudo-elliptical, shape. In other words, the perimeter of the base of the region of space covered has a substantially circular or elliptical, or pseudo-elliptical, shape. Pseudo-elliptical means that the shape can be approximated with an ellipse and differs from this, for example, because it does not have the canonical symmetries of an ellipse with respect to its main axes or because it presents a flattened shape, for example with opposite sides parallel.

Preferably, the device comprises at least a reinforcing element 8 of the cover suitable to act as a skeleton of the cover in its outstretched configuration and suitable to wind up in the wound configuration.

Figure 6:
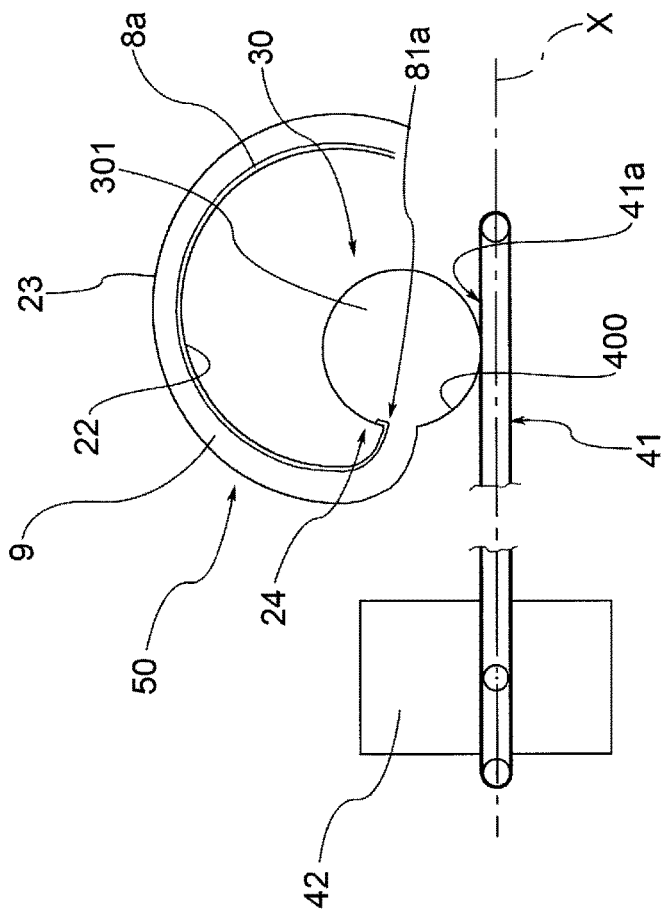
FIG. 6 is a schematic view, in frontal section, of the winding support, the winder device and the cover in a phase of winding the cover, with the cover almost totally unwound, in an embodiment of this invention.
Figure 6A:
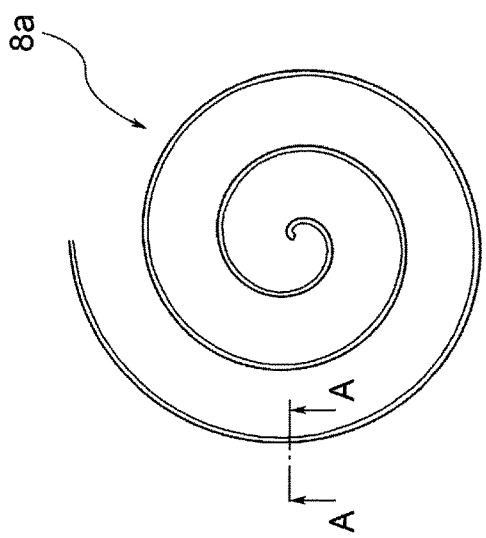
FIG. 6a is a schematic frontal view of a spiral-wound elastic band, according to an embodiment of this invention.

For example, the reinforcing element 8 comprises a plurality of elastic bands 8a,8b,8c integral with the cover 2 that extend radially from the case towards the perimeter of the cover 21 in the outstretched configuration and that are wound in a spiral in the wound configuration of the cover (for example as shown in FIG. 6a), so that the elastic force of said plurality of elastic bands 8a,8b,8c contributes to the forces needed for the phase of winding the cover 2 or vice versa for the outstretching phase of the cover. In other words, if the elastic bands 8a,8b,8c in the rest condition spontaneously assume an outstretched configuration, when they are wound in a spiral they store elastic energy that they release once the case is in its open configuration to help extend the cover and reach its outstretched configuration. Conversely, in another embodiment, if the elastic bands 8a,8b,8c in the rest condition spontaneously assume a spiral configuration, when they are outstretched in the extending phase of the cover, they store elastic energy that they are ready to release to help in the winding phase of the cover.

Figure 6B:
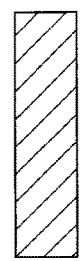
FIG. 6b is a sectional view of an elastic band, according to an embodiment of this invention.

Preferably, the elastic bands are steel springs in a spiral configuration (for example as shown in FIG. 6a), for example of the same type of metal strip springs used in windable roller shutters, having a thin rectangular cross-section (FIG. 6b).

In an embodiment, the cover 2 comprises at least one inner chamber 9 made of a flexible material impermeable to fluids. In this embodiment there is an inflation device and deflation device of the cover, in fluidic communication with the inner chamber 9 for the inflation and deflation of the cover 2 by means of a fluid introduced in, or removed from, the internal chamber 9. Preferably, with reference for example to FIG. 5, the inflation device and deflation device are made in a single device that comprises a compressor 10 in fluidic communication with the internal chamber 9 and valve means 50, suitable to direct the inflation fluid from the compressor 10 towards the inner chamber 9 in the case of inflation and from the inner chamber 9 to the compressor 10 in the case of deflation. The inflation fluid may be any type of compressible or incompressible fluid, for example air.

Preferably, the cover 2 is a cloth made of flexible material that, in a plan view from above (for example as in FIG. 3) is externally delimited by the external perimeter of the cover 21, spaced radially with respect to the case 4 in the outstretched configuration. Internally, the cloth is delimited by the internal perimetral segments 24, placed inside the case 4 and connected to a rotatable winding support 30, around which the cover 2 is wound in the wound configuration. The internal perimetral segments 24 are preferably joined together along their ends, so as to form a single internal perimeter.

The case 4 preferably has a box shape, having side walls 4a joined to a bottom wall 4b and a removable lid 4c to allow the opening of the case. Moreover, in the closed configuration, the lid 4c hermetically closes the case 4 so as to prevent possible water seepage.

Preferably, the opening and closing of the rigid case 4 takes place by means of an opening/closing device that allows the release of the cover 2 from the case 4 in the passage from the wound configuration to the outstretched configuration and that closes the case once the cover is in the wound configuration. Preferably, moreover, the opening/closing device is a motorised device.

Figure 4:
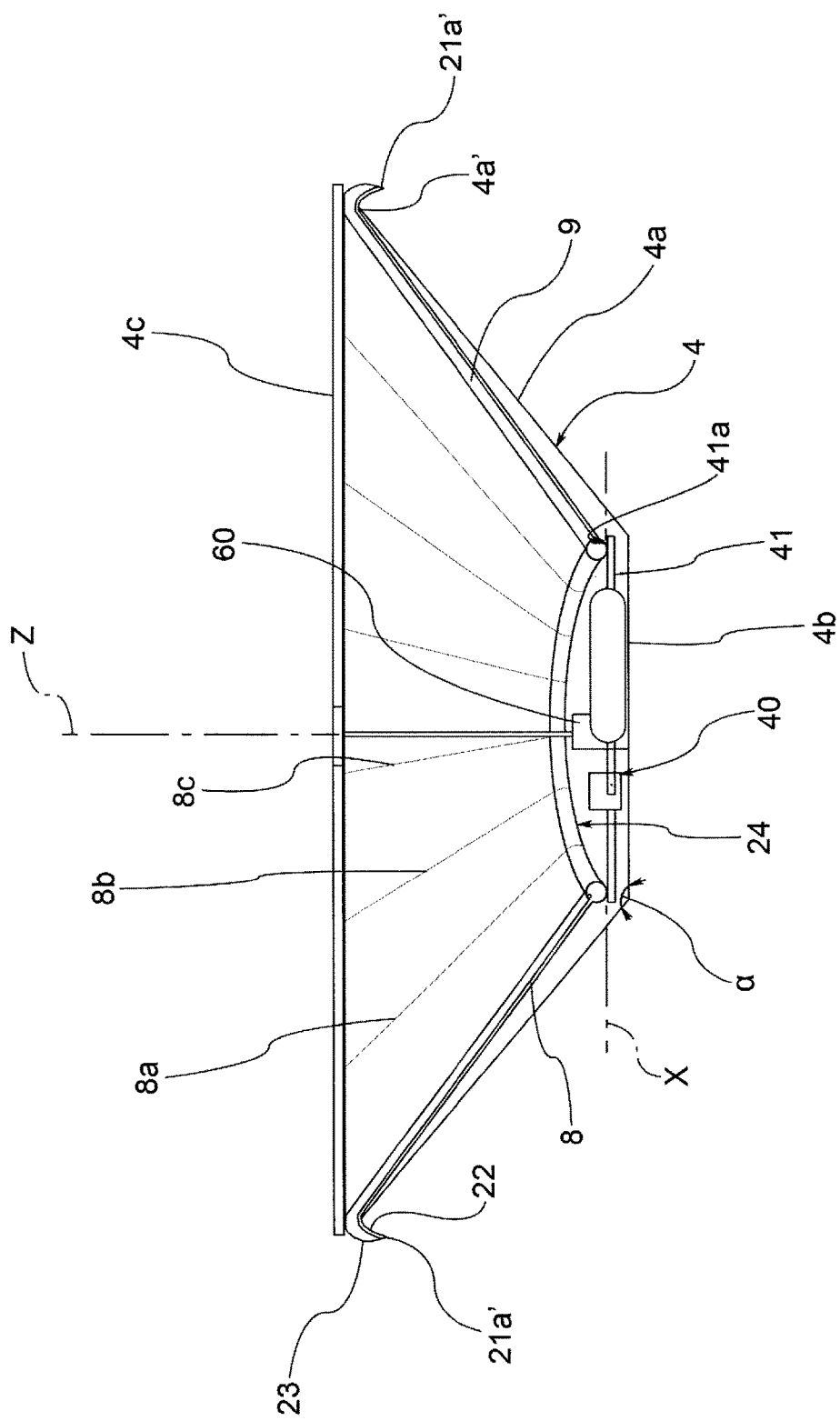
FIG. 4 shows a front sectional view of the cover device in an almost completely closed configuration, with the cover almost wound, in an embodiment of this invention.

For example, in an embodiment of the opening/closing device of the case, the lid 4c is translatable along a vertical direction Z so as to open a space between the edges of the side walls 4a' and the lid itself, to allow the release of the cover from the case (for example as shown in FIG. 4).

In this configuration, preferably, the lid is operatively connected with an actuator 60 suitable to allow the translation of the lid in the vertical direction Z, to open and close the case 4.

Preferably, the side walls 4a of the lid are inclined with respect to the bottom wall 4b by an obtuse angle $\alpha$. In this embodiment, the cover 2 slides along the inner surface of the side walls 4a both during the phase of extension of the cover and during the winding phase, so that the release of the cover 2 to the outside in the extension phase is facilitated and orderly. In other words, the side walls of the case 4a act as a sliding guide for the cover.

In a preferred embodiment of the invention, in a plan view from above, the cover has a substantially circular crown shape, in which the inner hole of the circular crown is contained in the case 4.

Figure 3:
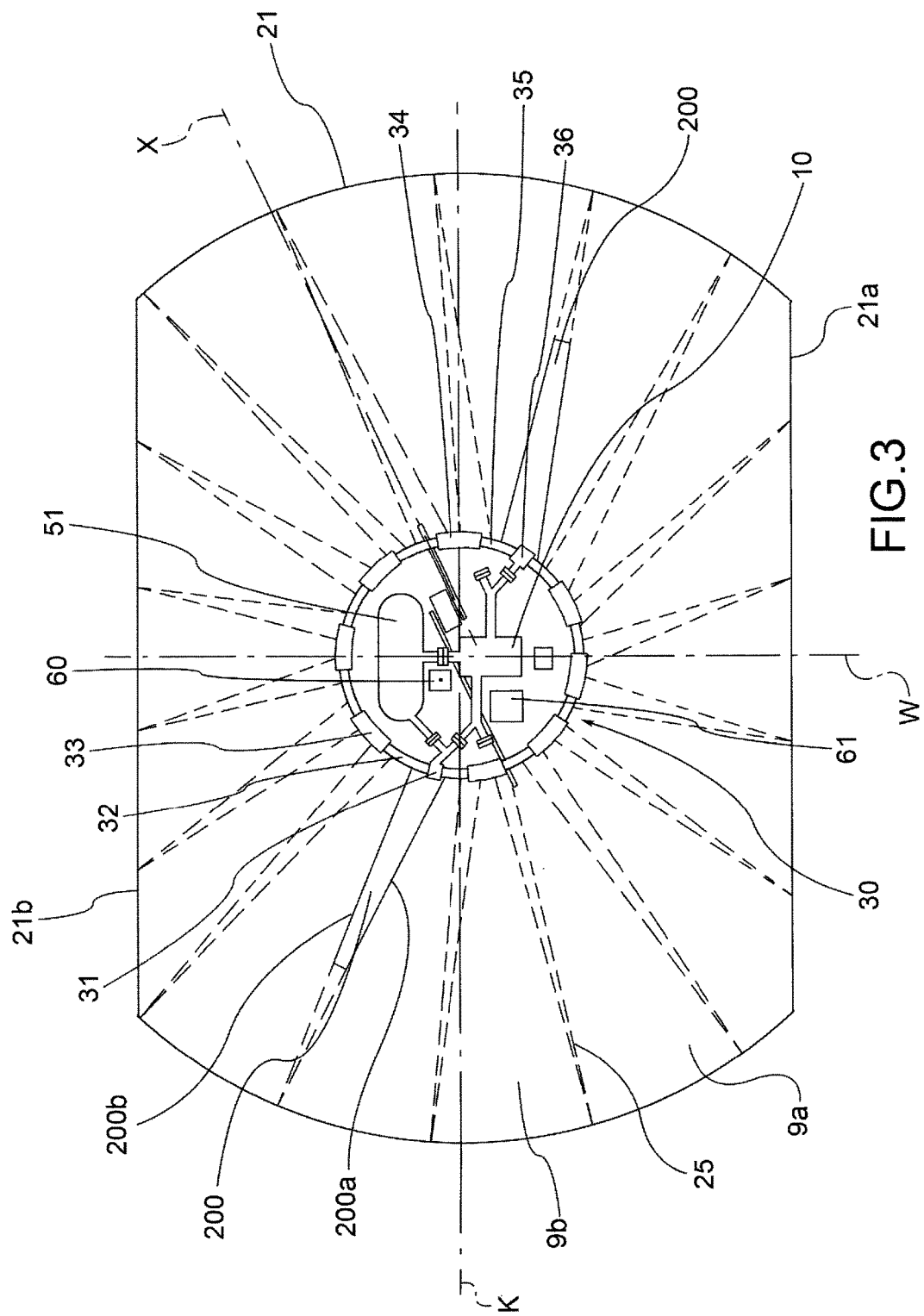
FIG. 3 shows a plan view of the cover device in an open and outstretched configuration of the cover, in an embodiment variant of this invention.

If intended to cover vehicles (whether land or sea vehicles), the circular crown shape is modified to adapt to different lengths and widths of the vehicles. For example, in the case of a motor car, the length is greater than the width and consequently, the "doughnut" shape of the circular crown will assume a pseudo-elliptical shape, for example having two opposite perimetral sides 21a,21b substantially rectilinear (for example as shown in FIG. 3), so that in a plan view from above of the cover in outstretched configuration, the distance between the opposite perimetral sides 21a,21b, calculated along a direction W perpendicular to the two sides, is greater than, or equal to, the width of the covered vehicle, while in the direction K perpendicular to the direction W the cover preferably has a length at least equal to the length of the vehicle. For example, the distance between the opposite perimetral sides 21a,21b is approximately equal to the sum of the length of the roof of the vehicle and of the height of the lateral sides of the vehicle, in such a way that, in the case in which the cover 2 assumes an "umbrella" shape (as in FIG. 2), such cover 2 envelops the entire vehicle in both the upper part and around the lateral sides.

Preferably, the inner chamber 9 is made as a space interposed between at least two layers 22,23 of material that is flexible and impermeable to fluid, joined together along a perimetral sealing joint 21a', in proximity of the perimeter of the cover 21. For example, the two layers 22,23 are two cloths superimposed to form a sandwich, having a circular crown shape, sewn or welded on the outer perimeter of the circular crown and whose inner circular perimeter is formed is formed by inner perimetral segments 24.

In an embodiment, the inner chamber is inserted inside of the cloth that constitutes the cover 2, while in another preferred embodiment the two layers 22,23 that constitute the inner chamber are also the two layers that constitute the cover 2. In particular, one 22 of the two layers is the outer lower layer of the cover facing towards the lower bottom surface 6, while the other layer 23 is the upper outer layer facing in the opposite direction (for example toward the sky). In other words the outer surface of the layers 22,23 is facing outwards and constitutes the cover 2, while the inner surface of the layers defines the internal chamber 9, which is therefore delimited by the inner surfaces of the layers 22,23, by the perimetral sealing joint 21a' and by the inner perimetral segments 24.

The inner chamber 9, can be divided into several internal chambers 9a,9b, separated from each other by means of suitable radial joints 25.

Preferably, the cover device 1 also comprises at least one winder device 40 that includes a taut belt or a taut band 41, suitable to be moved in a sliding direction X and having a contact surface 41a suitable to engage in contact with the cover 2 (for example with one of the two layers 22,23 that constitute the inner chamber 9) so that, during the movement of the belt or band 41, the cover is dragged in rotation to wind itself around the winding support 30 to create a roll 50. The contact surface 41a therefore remains tangent to said roll during winding 50 (an example of winding phase is shown in FIG. 6).

The winder device 40 also provides for an actuator 42 operationally connected to the belt or band 41 (for example through transmission means) to impress the movement of the taut belt or the band 41 in the sliding direction X.

Preferably, the rotatable winding support 30 is made in a modular manner and comprises a plurality of sleeves 31,32, 33,34,35,36 adjacent to each other. Each of the two ends of a sleeve is connected to the end of the adjacent sleeve in a rotatable manner about a main axis Q, for example the axis connecting the two ends or the axis passing through the centre of the two ends. In this way, a chain of sleeves is created rotatably engaged with each other that form the winding support 30 around which the cover 2 is wound.

Preferably, each inner perimetral segment 24 of the cover is joined to a respective sleeve. In this way, as the sleeves are placed in rotation, the cover is dragged and wound around the sleeves and, thus, around the winding support 30.

Preferably, the winding support 30 has a curved shape and is housed in the case 4 in proximity of the bottom wall 4b; even more preferably, the winding support 30 has an annular shape. In other words, the chain of sleeves is formed by a plurality of adjacent sleeves joined together by means of joints that allow the mutual rotation of a sleeve with respect to the adjacent sleeve.

Figure 8:
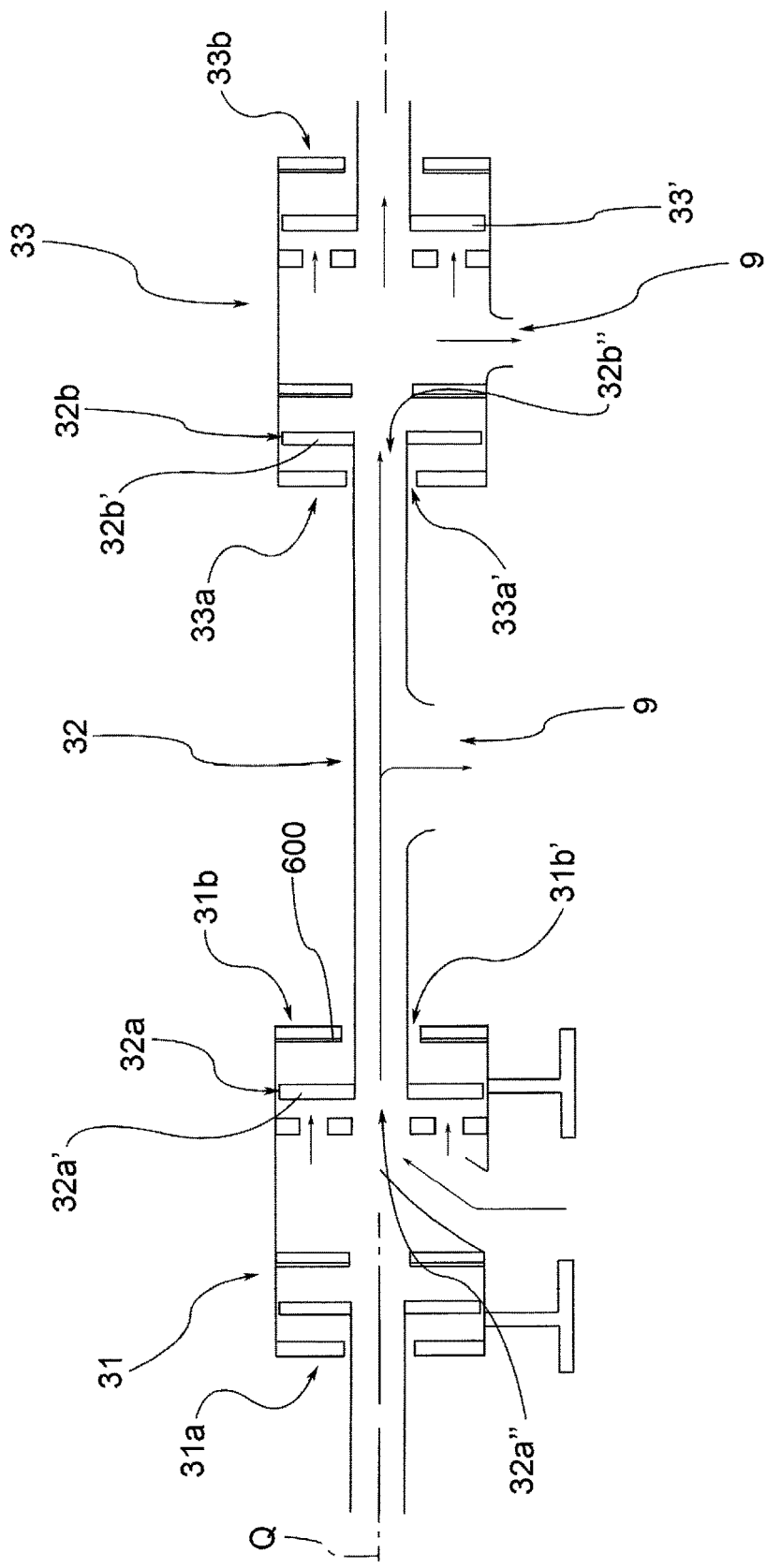
FIGS. 8 and 8a are a schematic sectional view of a modular portion of the winding support, in proximity of a fixed sleeve provided with an inlet for the introduction of fluid destined to an inner chamber of the cover, in an embodiment of this invention.
Figure 8A:
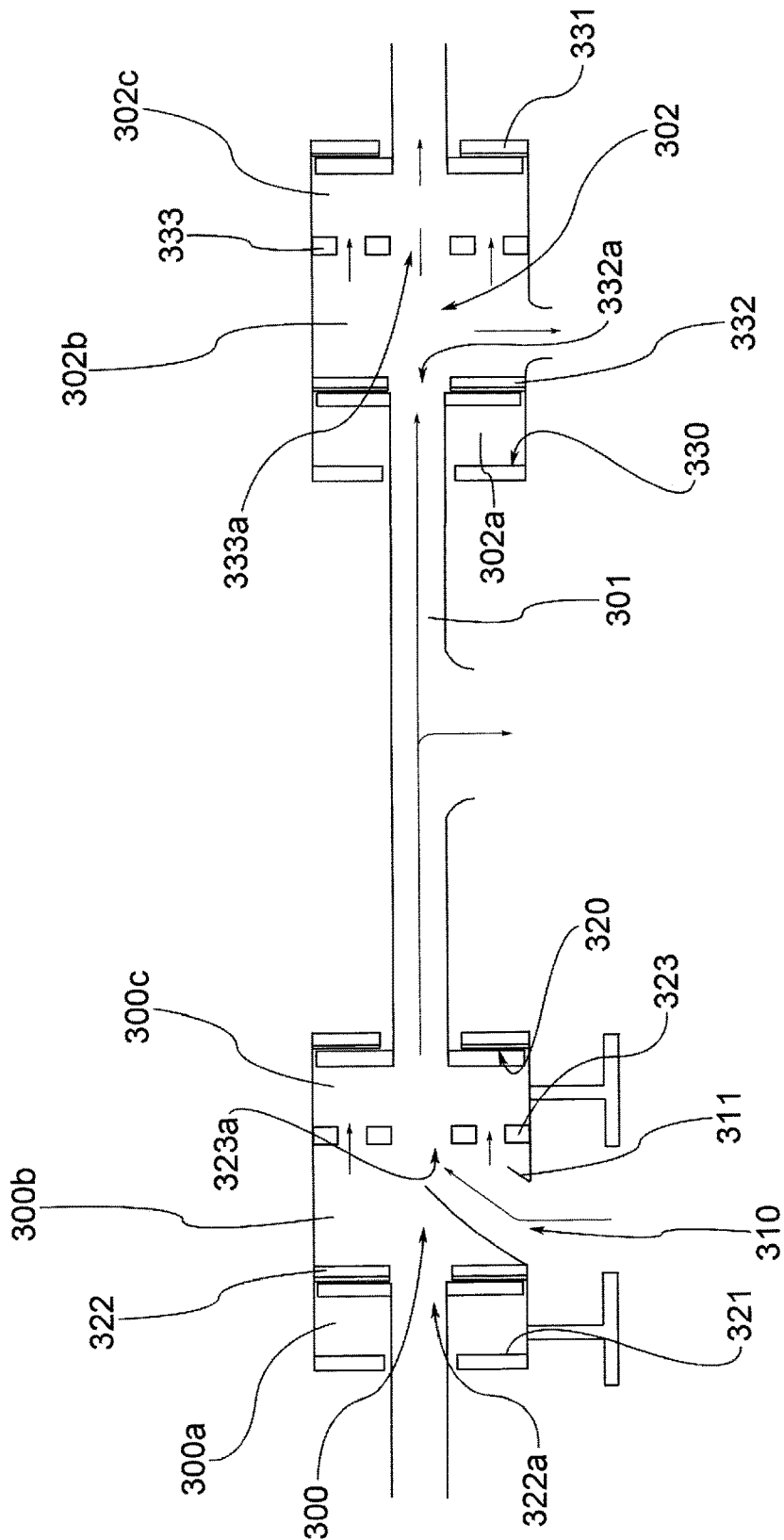
Figure 8B:
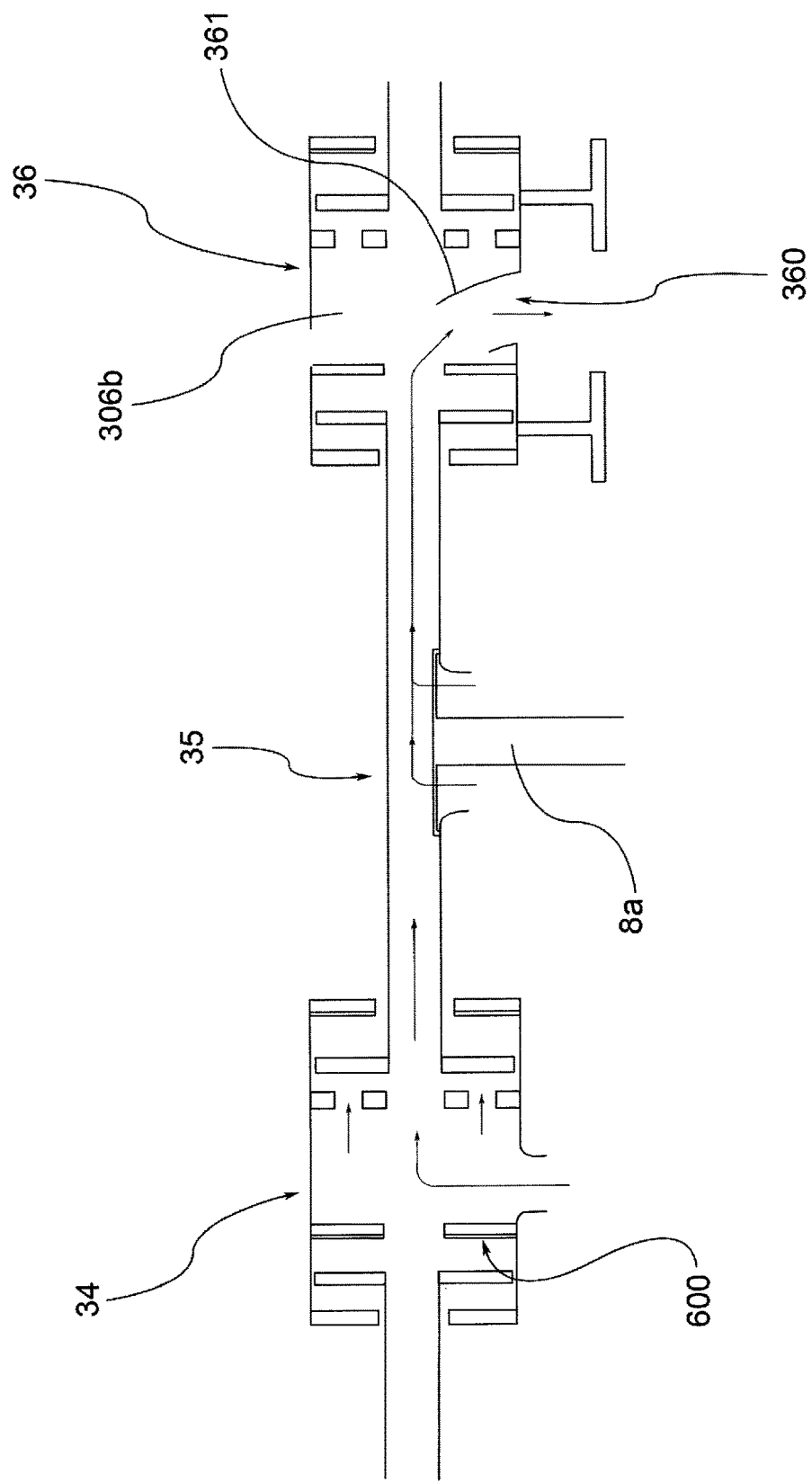
FIG. 8b is a schematic sectional view of a modular portion of the winding support, in proximity of a fixed sleeve provided with an outlet for the discharge of fluid from the inner chamber of the cover, in an embodiment of this invention.

A modular portion of chain of sleeves rotatably engaged with each other that form the winding support 30 is shown for example in FIGS. 8 to 8b.

Preferably, each sleeve encloses a cavity 300,301,302 passing through from side to side between a right end 31b,32b,33b and a left end 31a,32a,33a of the sleeve. Each cavity 301 is in fluidic communication with the cavity 302 of the sleeve 33 adjacent the right end 32b, with the cavity 300 of the sleeve 31 adjacent the left end 32a and, preferably, also with the inner chamber 9 or the sub-chamber 9a,9b the cover 2. Furthermore, at least one sleeve is in fluidic communication with the inflation and deflation device.

Consequently, the chain of sleeves, having the cavities of each sleeve in fluidic communication with each other, creates a winding support 30, substantially tubular in shape, within which it is possible to circulate a fluid. Furthermore, since at least one sleeve is in fluidic communication with at least one inner chamber 9 of the cover 2, the chain of sleeves realises a distribution circuit of the fluid towards the inner chamber(s) 9a,9b of the cover to allow inflation and deflation.

Preferably the sleeves are made of plastic material or metal or rubber. For example, they can be small tubes be made of rubber or PVC. In addition, preferably, each sleeve is joined to a respective elastic band 8a,8b, integral with the cover. In particular, each elastic band is anchored along one of its ends 81a to an inner wall 400 of the sleeve that defines the inner cavity of the sleeve itself, as shown in FIG. 6. The union between the sleeve and the elastic band can be made by a mechanical fixing means (screws, bolts, etc.) or by interlocking, gluing or welding.

In an embodiment, the plurality of sleeves adjacent to each other comprises a repeated alternation of male sleeves 32,35 with female sleeves 31,33,34,36, in which the right end 32b of the male sleeve is inserted through a left hole 33a' formed on the left end 33a of a female sleeve 33 adjacent to the right of the male sleeve 32 and the left end 32a of the male sleeve 32 is inserted through a right hole 31b' made on the right side 31b of a female sleeve 31 adjacent to the left of the male sleeve 32.

Each of the right 32b and left 32a ends of the male sleeve 32, respectively comprises a right annular wall 32b' and a left annular wall 32a' projecting radially around each entrance (right 32b'' and left 32a'') to the cavity 301. These right 32b' and left 32a' annular walls prevent the escape of the male sleeve 32, respectively from the right adjacent female sleeve 33 and the left adjacent female sleeve 31. Moreover, each annular wall 32b', 32a' is suitable to move internally in abutment respectively with a left head wall 330 and a right head wall 320, on which are respectively formed the left hole 33a' and right hole 31b' of the respective female sleeves 33 and 31. These right 320 and left 330 head walls thus prevent the escape of the left 32a' and right 32b' annular walls, respectively, from the right 31b' and left 33a' holes.

Preferably, each female sleeve 31,33 comprises inside the cavity 300,302 at least one left sub-chamber 300a,302a, a central sub-chamber 300b,302b and a right sub-chamber 300c,302c adjacent to each other. The left sub-chamber 300a,302a is defined between the left head wall 321,330 and a first left sealing wall 322,332 spaced parallel and internally in the axial direction Q with respect to the left head wall 321,330. The right sub-chamber 300c,302c is defined between the right head wall 320,331 and a first right containment wall 323,333 spaced parallel and internally in the axial direction Q with respect to the right head wall 320,331. The central sub-chamber 300b,302b is interposed between the two right 300c,302c and left sub-chambers 300a,302a. On the left sealing wall 322,332 is formed at least one hole 322a,332a that allows the fluidic communication between the left sub-chamber 300a,302a and the central sub-chamber 300b,302b. This left sealing wall 322, 332 is also suitable to receive in sealed abutment the annular wall 32b' of the male sleeve when pressurised fluid is introduced in the sleeve cavities through the inflation means. On the right containment wall 323,333 is formed at least one hole 323a,333a that allows fluidic communication between the right sub-chamber 300c,302c and the central sub-chamber 300b,302b. The right head wall 320,331 is also suitable to receive in sealed abutment the left annular wall 32a',33' of the male sleeve when pressurised fluid is introduced in the sleeve cavities through the inflation means.

Preferably, at least one 31,36 of the plurality of sleeves is fixed and anchored to one of the walls 4a,4b that define the hard case 4 and has the function of supporting the plurality of sleeves that form the chain. For example, a first fixed sleeve is a female sleeve 31 having an input mouth 310 made on a wall of the central sub-chamber 300b for the output of the pressurised fluid coming from the inflation device. A second fixed sleeve 36 is a female sleeve having an output mouth 360 made on a wall of the central sub-chamber 306b for the discharge of the pressurised fluid coming from the inner chamber(s) 9,9a,9b of the cover.

Figure 7:
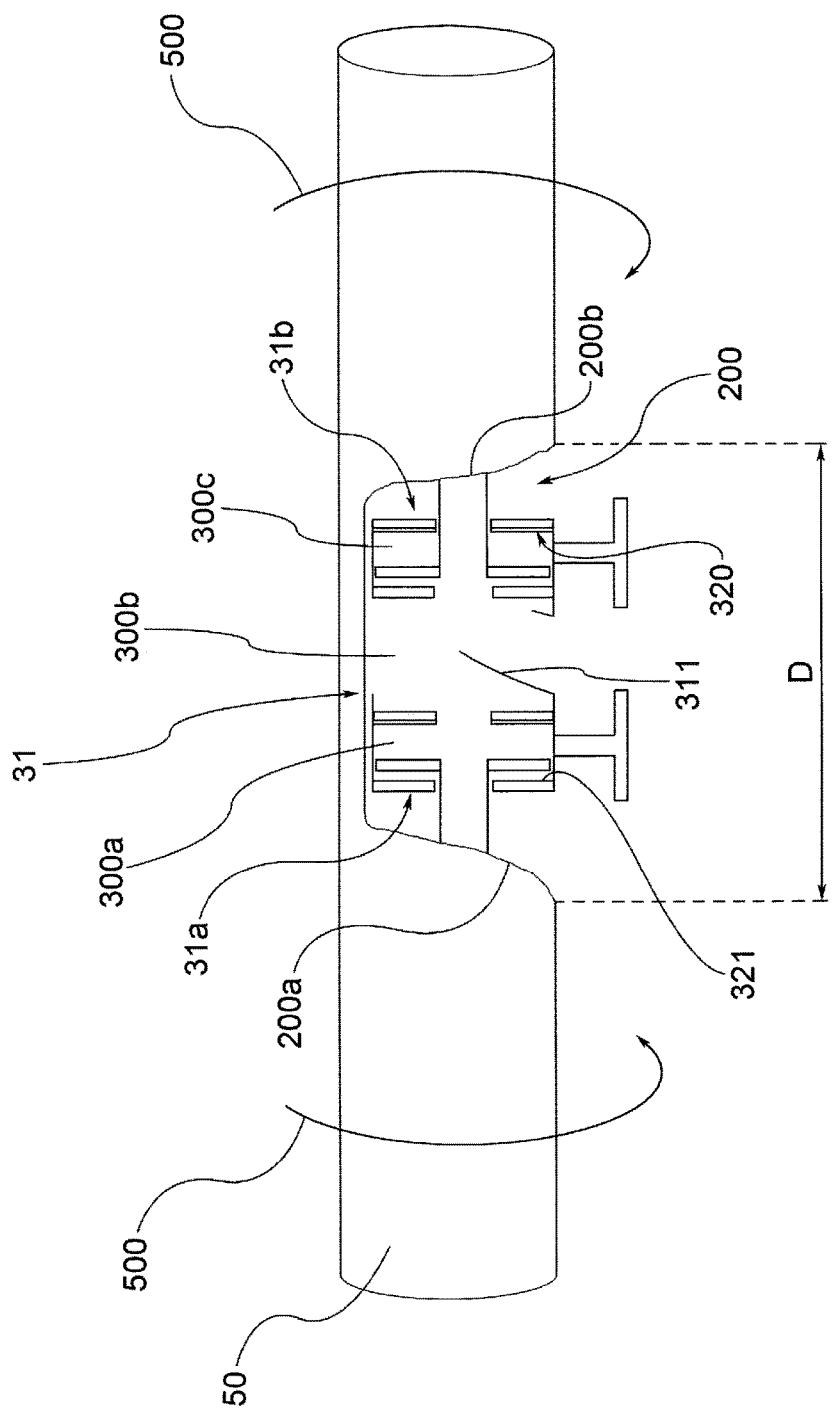
FIG. 7 is a schematic view, partially in frontal section, of a portion of the winding support, in proximity of a fixed sleeve and a portion of cover wound on the winding support, in an embodiment of this invention.

At each of the fixed sleeves 31,36, the cover 2 has an opening 200 that extends along the radial direction. In particular, given that the fixed sleeves cannot rotate, the cover is not joined to these fixed sleeves 31,36. In other words the perimetral segments 24 of the cover are not joined to the fixed sleeves 31,36, but are joined to their adjacent male sleeves 32,35. Therefore, as shown in FIG. 7, astride each fixed sleeve there is a discontinuity in the cover 2, in the form of an opening with mainly radial extension, having a width D at least equal to the distance between the right end 31b and the left end 31a of the fixed sleeve. In this way, the presence of a fixed sleeve does not prevent the winding of the cover in the winding direction indicated by the arrows 500 in FIG. 7. When the cover 2 is in the outstretched configuration, this opening 200 is filled thanks to the inflation phase of the cover 2 that allows bringing together the edges 200a,200b of the opening 200 until they fit tightly. As shown in FIG. 3, preferably the opening 200 does not extend up to the outer perimeter 21 of the cover, but extends only in the portion of cover destined to be wound.

Preferably, inside the central sub-chamber 300b of the first fixed sleeve 31, guide walls 311 are made to convey the flow of liquid coming from the input mouth 310 towards the left input 32a" of the cavity 301 and on the left annular wall 32a' of the adjacent right male sleeve 32. In this way, the flow of liquid, in addition to entering the cavity 201 (and consequently in the entire fluid distribution circuit), pushes in abutment the left annular wall 32a' of the male sleeve 32 against the adjacent right head wall 320. The left annular wall 32a' is thus in sealing abutment with the right head wall so as to convey the pressurised fluid coming from the inlet mouth 310 only towards the cavity 301. Consequently, upon the translation of the male sleeve 32, also the right annular wall 32b' is sealingly in abutment against the left sealing wall 332, thus allowing the fluid to continue towards the central sub-chamber 302b of the next adjacent female sleeve. This configuration is repeated for each pair of adjacent male and female sleeves and, consequently, when the flow of pressurised fluid begins to enter from the inlet mouth 310, there is a shift to the right in the axial direction Q of the male sleeves of the chain until each left annular wall 32a',33' of each male sleeve goes in abutment to the respective right head wall 320,331 of the adjacent female sleeve 31,33 and each right annular wall 32b' of each male sleeve is goes in abutment to the respective left sealing wall 332 of the adjacent female sleeve 33 (as, for example, shown in FIG. 8a). Inside the central sub-chamber 306b of a second sleeve 36 are formed other guide walls 361 to convey the flow of fluid coming from the inner chamber(s) 9,9a,9b towards the outlet mouth 360 for the discharge of the fluid and the deflation of the inner chamber(s) 9,9a,9b (as, for example, shown in FIG. 8b). The deflation of the inner chamber(s) is, for example, forced through the compressor 10 of the deflation device. During deflation, the seal between the sleeves is ensured in the same way as the inflation phase described above, given that the direction of the fluid flow is the same, as is evident from the arrows shown in FIGS. 8, 8a and 8b. Consequently, what was described for the phase in which the fluid is introduced into the sleeves by the inflation means also applies in the case in which the fluid is extracted from the sleeves by the deflation means, and thus, more generally, when the fluid is put in circulation in the inflation phase or in the deflation phase.

In an embodiment, the walls that rest on or abut each other comprise at least one gasket 600 that is interposed between the walls to improve the seal; for example the gasket is interposed between the left annular wall 32a' and the right head wall 320, preferably, it is a film made of plastic material or rubber adhering to one of the two walls 32a' or 320.

In an embodiment variant, the compressor 10 is in fluidic communication with a tank 51 that contains a reserve of pressurised fluid. The tank 51 is also in fluidic communication also with the inner chamber 9 by means of fluidic communication paths 53 that connect the tank to the inlet mouth 310 of one of the sleeves. A first tank valve 52 is suitable to enable or interrupt the fluidic communication between the tank 51 and the inlet mouth 310 of the sleeve and, therefore, to the inner cavity of the tubular winding support 30. A second tank valve 54 is suitable to enable or interrupt the fluidic communication between the tank 51 and the compressor 10.

Preferably, the compressor 10 is in fluidic communication with at least one male sleeve 31 through fluidic communication means 54', such as pipes or tubes. For example, the fluidic communication means 54' put the compressor 10 in communication with the inlet mouth 310 and/or with the outlet mouth 360 of at least one of the sleeves, preferably one of the fixed sleeves. Furthermore, valve means are provided suitable to manage the direction of flow of the fluid from the compressor 10 towards the cavity of the sleeves in the inflation phase and vice versa from the cavity towards the sleeves in the deflation phase. Preferably, a first compressor valve 55 is suitable to enable or interrupt the fluidic communication between the compressor 10 and the inlet mouth 310 of the sleeve 31, thus enabling and interrupting the flow towards the inner cavity of the tubular winding support 30. A second compressor valve 56 is suitable to enable or interrupt the fluidic communication between the compressor 10 and the outlet mouth 360 of a sleeve 36, thus enabling or interrupting the flow from the cavity of the sleeve towards the compressor 10 in the deflation phase of the inner chamber(s).

Furthermore, in the embodiment in which the fluid used to inflate/deflate the inner chamber 9 is air, additional valve means 57,58 put the compressor 10 in fluidic communication with the external environment for the supply or discharge of air. In particular, a first shut-off valve 57 enables or interrupts the fluidic communication between the compressed air outlet mouth of the compressor 10 and the external environment, while a second shut-off valve 58 enables or interrupts the fluidic communication between the outside air inlet mouth of the compressor 10 and the outside environment.

In an embodiment, the cover device also comprises an electronic control unit 61, configured to receive command to open/close the case (for example, remote commands via electromagnetic waves, such as radio signals, signals from devices connected in Wi-Fi or Bluetooth, etc.) and to manage the opening and closing of the valve means suitable to manage the direction of fluid flow from the compressor 10 towards the cavity of the sleeves and vice versa and/or towards the tank 51. Furthermore, the control unit 61 is configured to send the actuation commands of the compressor 10 and the actuation and interruption commands of the actuators 42 and 60 for moving the belt/band 41 and the lid 4c.

In the case of use of the cover device on a vehicle, a buffer battery 59 is preferably connected to the control unit 61, to the compressor 10 and to the actuators 42,60 and it is also suitable to be connected to the main battery of the vehicle in such a way as to be recharged while the vehicle is running so as to at least partially provide the necessary energy to the actuators and compressor for extending and/or closing the cover. This reduces the risk of completely discharging the main W battery of the vehicle.

Preferably, the cover is made of a material impermeable to the weather, such as PVC, and/or of a cut-resistant material, for example a material comprising para-aramid fibres, carbon fibres, high-tenacity polyethylene fibres and/or metal fibres. Furthermore, the cover can also provide an outer coating layer of a material suitable to not cause scratches on the surfaces with which the cover comes into contact (for example the bodywork of a vehicle). This scratch-resistant material can for example be a flexible plastic material (rubber, PVC, polyethylene sheets, etc.).

A preferred embodiment of the invention provides that the cover device is portable. In other words, the cover device has dimensions and weight such as to allow easy transport in the vicinity of the region of space that must be protected. For example, in the case in which the cover device is intended to protect a vehicle such as an automobile, the bottom wall 4b has a smaller area than the area of the roof of the automobile on which the cover device is placed and, in addition, its weight is suitable to allow lifting by an operator having average ability, to place it on the roof of the vehicle.

In addition, preferably, the safety device of this invention comprises magnetic coupling means suitable to anchor the hard case 4 to the support 5 that distances it from the lower bottom surface 6. For example, in the case in which the device is used to protect a motor vehicle, the bottom wall 4b of the case 4 is equipped with magnetic means (permanent magnet or electromagnet) suitable to allow the magnetic coupling with the motor vehicle roof.

For vehicles that do not have surfaces suitable to receive and support the case or if the cover device is used to cover construction site or exhibition areas or, more generally, regions of space, the support 5 is for example a pole, a trestle, a tripod or a frame anchored to the vehicle frame or to the bottom surface 6 of the area to be covered by means of fixing means. This support also comprises a support surface integral to the support 5 and suitable to receive the case 4 in support.

This invention also covers the method for the protection of a region of space by means of a cover device as described in the previous paragraphs. The method comprises the following steps:
  providing a cover device comprising a cover enclosed in a rigid case and placing said cover device in an area of space designated to be protected by the cover in an elevated position with respect to a bottom surface area 6;
  opening the case;
  taking the cover out of the case by unwinding and outstretching the cover in a radial direction and around the case to cover the area of space.

As already described, in an embodiment, the method also includes inflating the chamber inside the cover up to a certain operating pressure.

Preferably, when the cover is completely extended, the fluid tank 51 introduces into the inner chamber all the fluid previously accumulated. In the case of use of the cover device to protect vehicles, the accumulation of fluid in the tank occurs for example when the vehicle is in motion, thus saving energy coming from the battery.

Once the function of protecting the area of space is ended, the cover is rewound.

To retract the cover, preferably, the cover is first deflated and the compressor is activated with the function of aspirating the fluid from the inner chamber to completely empty it. When the aspiration step is completed, or simultaneously with it, the cover 2 is rewound inside the case 4 by means of the winder device 40, preferably aided by the elastic bands 8a,8b,8c which tend to rewind in the rest position. At the end of rewinding, the lid 4c is hermetically closed.

Preferably, the pressurised fluid tank 51 is refilled through the valve means 54 by the compressor 10.

Preferably, after the phase of inflation or deflation of the cover, the valves 52,54,55,56,57,58 are closed, so as to avoid the entry of foreign bodies into the compressor and/or the tank.

The inflation phase of the inner chamber(s) of the cover preferably takes place in the following steps:
  opening of the first tank valve 52, which allows discharging the fluid from the tank 51 into the inner chamber 9 of the cover;
  closing of the first tank valve 52;
  opening of the second shut-off valve 58 and of the first compressor valve 55 and actuation of the compressor for the introduction of pressurised fluid into the inner chamber(s) 9 of the cover until reaching the predetermined pressure.

Prior to actuation of the compressor 10, the first shut-off valve 57 and the second compressor valve 56 are in the closed position. In the case in which the control unit detects that the first shut-off valve 57 and the second compressor valve 56 are not in the closed position, the method also provides for the step of closing the first shut-off valve 57 and the second compressor valve 56.

The deflation phase of the inner chamber(s) of the cover preferably takes place in the following steps:
  opening of the first shut-off valve 57 and the second compressor valve 56;
  actuation of the compressor for the extraction of pressurised fluid in the inner chamber(s) 9 of the cover until the complete emptying of the inner chamber(s) 9.

Prior to actuation of the compressor 55, the second shut-off valve 58 and the first compressor valve 55 are in the closed position. If the control unit detects that the second shut-off valve 58 and the first valve of the compressor 55 are not in the closed position, the method also provides for the step of closing the second shut-off valve 58 and of the first compressor valve 55, in order to prevent the fluid aspirated from the internal chamber from returning to the inner chamber 9 through the compressor valve 55 or that the aspiration of fluid is slowed down by the presence of the shut-off valve 58 in the open position.

Figure 5:
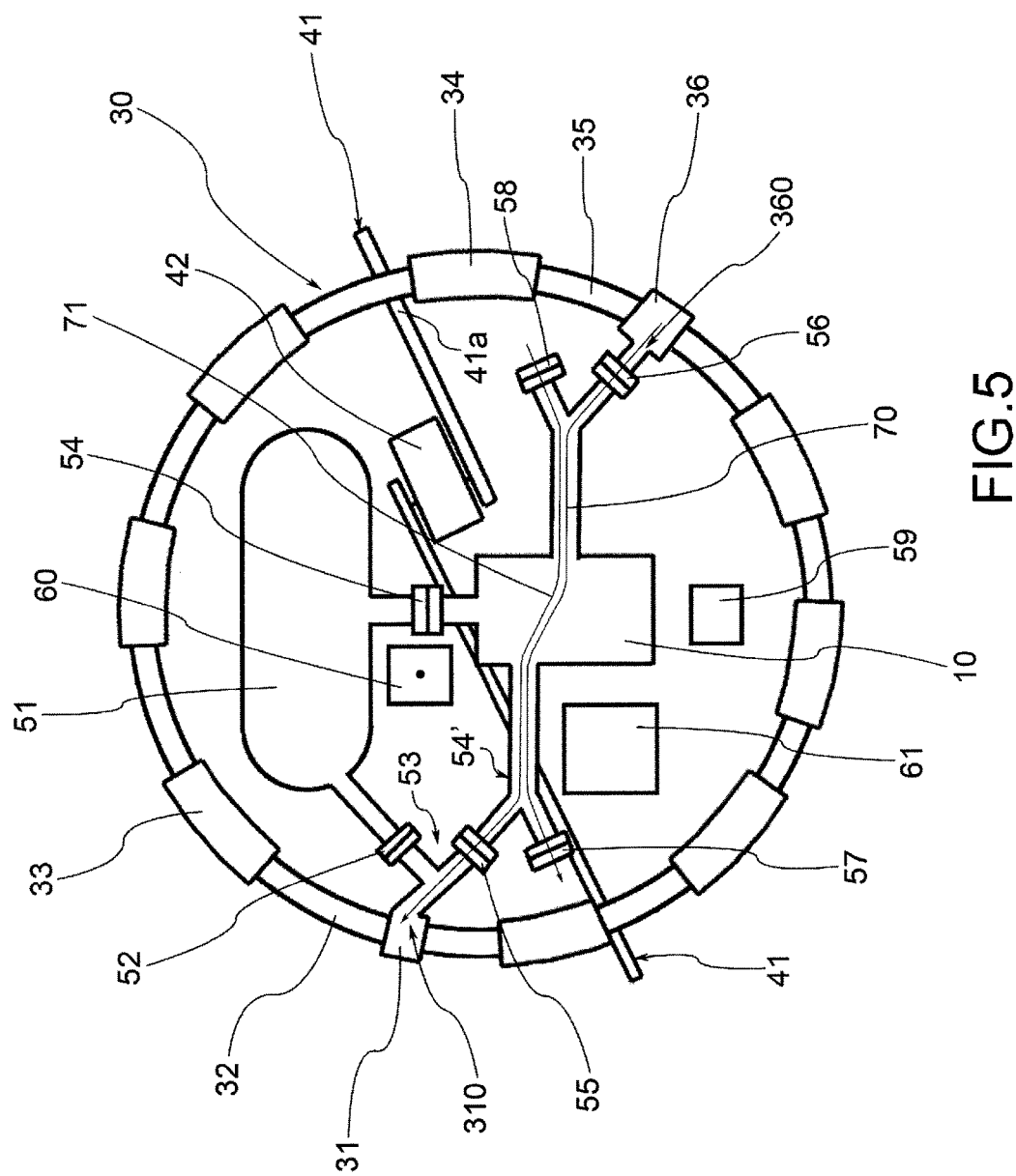
FIG. 5 shows a detail of FIG. 3, in an embodiment of this invention.

The direction of fluid flow for the inflation and deflation phases described in the two preceding paragraphs, is represented in FIG. 5 by the arrow 70 for the deflation phase and by the arrow 71 for the inflation phase.

Note that, after the deflation and aspiration of the fluid, there being no more pressure inside the fluid distribution circuit, the sleeves that constitute the distribution circuit (that is, the winder device 30) are free to rotate on themselves and it is thus possible to proceed to the next phase of winding the cover around the sleeves.

Innovatively, this invention provides a cover device suitable to protect a region of space from the weather and/or possible acts of vandalism, with fast and simple operations of opening and closing of the cover, without the need for the user to perform strenuous manual operations to stretch out the cover.

Furthermore, the cover device is easily transportable thanks to the innovative system of winding the cover that reduces the overall dimensions to a minimum.

The device according to this invention is feasible in many variants having different scales. For some of them, the device has reduced dimensions that allow easy storage. For example, the cover device can be used as a transportable cover in the boating (mainly small and medium-sized craft) or automotive (cars, campers, trucks) sectors. Or, the cover device is suitable to also be used to protect larger areas, for example in the aeronautics sector, or for the protection of photovoltaic panels, or in the construction sector to protect a roof or terrace from the elements while they are being rebuilt, or for the protection of working means in agriculture or in construction yards.

Advantageously, moreover, the cover device of this invention also comprises an inflatable cover that allows stiffening the structure without the need to resort to bulky support structures. The presence of the air cushion in the inner chamber allows maintaining an adequate temperature inside the covered area thanks to isolation from the outside environment. In the case of use of the device to cover an automobile, this is particularly advantageous during the summer, in which the vehicle often remains for long periods under constant solar radiation, which generally causes a rapid increase of the temperature inside the vehicle.

Advantageously, moreover, the protective device is equivalent to a portable garage, as it allows the covering the vehicle even in the street, protecting it from hail and rain and also by acting as an anti-theft device.

Even more advantageously, thanks to the presence of the elastic steel bands integrated in the cover, the device according to this invention creates a cage around the covered area, acting as a deterrent to potential thieves or intruders who want to access the covered area. For example, a car cannot be driven without the complete rewinding of the protective cloth, or it would be necessary to cut all the steel springs, or to cut part of the steel springs and remove the entire container to be able to see to drive.

It is clear that one skilled in the art, in order to meet specific needs, may make changes to the cover device or the method described above, all contained within the scope of protection defined by the following claims.

The invention claimed is:

1. Cover device, comprising:
a cover suitable to assume a wound configuration and an outstretched configuration,
a hard case suitable to be placed on a stand keeping said case elevated with respect to a lower bottom surface,
said case being suitable to assume a closed configuration, in which the cover is at substantially contained in said case in a wound configuration, and an open configuration, in which the cover is suitable to come out, the cover unwinding and outstretching around said case in a radial direction, passing from the wound configuration to the outstretched configuration to cover an area of space under the cover and between the lower bottom surface and said cover;
at least one inner chamber of a flexible material and sealing to fluid material; and
an inflation device and a deflation device of the cover, said inflation device and said deflation device being in fluidic communication with the at least one inner chamber to inflate and deflate the cover by a fluid introduced to or removed from the inner chamber.

2. Cover device according to claim 1, in which a plan projection from above of region of space covered, has a substantially circular shape or elliptical shape, or pseudo substantially elliptical shape.

3. Cover device according to claim 1, comprising at least a reinforcing element of the cover suitable to act as a skeleton of the cover in the outstretched configuration and suitable to wind up in the wound configuration.

4. Cover device according to claim 3, wherein the reinforcing element includes a plurality of elastic bands integral with the cover which extend radially from the case towards a perimeter of the cover in the outstretched configuration and which are wound in a spiral in the wound configuration of the cover, so that elastic force of said plurality of elastic bands contributes to forces needed for winding of the cover or vice versa for the outstretching of the cover.

5. Cover device according to claim 1, wherein the at least one inner chamber is made as a space interposed between at least two layers of flexible material and sealing to fluid material, joined together along a perimetral sealing joint.

6. Cover device according to claim 1, wherein the cover is a cloth of flexible material delimited externally by an outer perimeter, radially spaced from the case in the outstretched configuration and delimited internally by internal perimetral segments, positioned inside the case and connected to a rotatable winding support, which the cover winds around in the wound configuration.

7. Cover device according to claim 6, comprising at least one winder device which includes:
a taut belt or a taut band, suitable to be moved in a sliding direction and having a contact surface suitable to engage in contact with the cover so that, during movement of the belt or band, the cover is dragged in rotation to wind around the winding support to create a roll, the contact surface being tangent to said roll;
an actuator operationally connected to the belt or band to impress the movement of the taut belt or the band in the sliding direction.

8. Cover device according to claim 6, wherein the rotating winding support comprises a plurality of sleeves adjacent to each other, wherein each inner perimetral segment of the cover is joined to a respective sleeve and wherein each of two ends of the sleeve is connected to an end of the adjacent sleeve in a rotatable manner around a main axis, the axis joining the two ends.

9. Cover device according to claim 8, wherein at least one of the plurality of sleeves is fixed and anchored to one of walls which define the hard case and supports the plurality of sleeves.

10. Cover device according to claim 8, wherein each sleeve encloses a through cavity from one side to the other side between a right end and a left end of the sleeve said cavity being in fluidic communication with the cavity of the right sleeve adjacent to the right end and with the cavity of the left sleeve adjacent to the left end and with the inner chamber of the cover.

11. Cover device according to claim 10, wherein the plurality of sleeves adjacent to each other includes a repeated alternation of a male sleeve and a female sleeve, wherein a right end of the male sleeve is inserted through a left hole made on a left end of a female sleeve adjacent on the right end of the male sleeve and a left end of the male sleeve is inserted through a right hole made on a right end of a female sleeve-adjacent to the left end of the male sleeve, each of the right and left ends of the male sleeve respectively comprises a right annular wall and a left annular wall projecting radially around each right and left entrance to the cavity, said right annular wall and said left annular wall preventing escape of the male sleeve respectively from the adjacent right female sleeve and the adjacent left female sleeve, and being adapted to abut internally respectively with a left head wall and with a right head wall, on which the left hole and the right hole of the respective female sleeves are made.

12. Cover device according to claim 11, wherein each female sleeve comprises inside the cavity at least one left sub-chamber, a central sub-chamber and a right sub-chamber adjacent to each other, wherein:

the left sub-chamber is defined between a left head wall and a first left sealing wall spaced parallel and internally in an axial direction with respect to the left head wall, the right sub-chamber is defined between a right head wall and a first right containment wall spaced parallel and internally in the axial direction with respect to the right head wall, the central sub-chamber being interposed between the two right and left sub-chambers, on said left sealing wall a hole being made which allows fluidic communication between the left sub-chamber and the central sub-chamber and said left sealing wall being suitable to receive in sealed support the right annular wall of the male sleeve when pressurised fluid circulates in the cavities of the sleeves by effect of the inflation device and the deflation device, on said right containment wall at least one hole being made which allows fluidic communication between the right sub-chamber and the central sub-chamber and said right head wall being suitable to receive in sealed abutment the left annular wall of the male sleeve when pressurised fluid circulates in the sleeve cavity by effect of the inflation device and the deflation device.

13. Cover device according to claim 11, wherein a first fixed sleeve is anchored to one of the walls that define the case and the first fixed sleeve is a female sleeve having an input mouth made on a wall of the central sub-chamber for delivery of pressurised fluid coming from the inflation device, and wherein a second fixed sleeve is a female sleeve having an output mouth made on a wall of the central sub-chamber for discharge of the pressurised fluid coming from the inner chamber of the cover.

14. Cover device according to claim 13, wherein inside the central sub-chamber of the first fixed sleeve, first guide walls are made to convey flow of liquid coming from the input mouth towards the left input of the cavity and on the left annular wall of the adjacent right male sleeve, and wherein inside the central sub-chamber of the second sleeve, second guide walls are made to convey flow of fluid coming from the inner chamber towards the outlet mouth for discharge of the fluid and deflation of the inner chamber.

15. Cover device according to claim 1, wherein the cover is made of waterproof and cut-resistant, anti-weathering material.

16. Cover device according to claim 1, comprising a motorized opening and closing device of the rigid case to release the cover from said case in the passage from the wound configuration to the outstretched configuration.

17. Cover device according to claim 1, wherein said cover device is portable.

18. Cover device according to claim 1, comprising a magnetic coupling suitable to anchor the rigid case to the support.

19. Cover device according to claim 1, wherein the cover is suitable to cover a vehicle and said cover assumes an umbrella shape in the outstretched configuration so as to surround the vehicle is in an upper part at least partially, or completely, around lateral sides of the vehicle.

20. Method for protection of an area of space from atmospheric agents by a cover device comprising the following steps:

providing a cover device comprising a cover having at least one inner chamber of a flexible material, said cover being enclosed in a rigid case and placing said cover device in an area of space designated to be protected by the cover in an elevated position with respect to a bottom surface area;

opening the case;

taking the cover out of the case by unwinding and outstretching the cover in a radial direction and around the case to cover the area of space; and inflating the inner chamber inside the cover up to an operating pressure.

* * * * *